Feb. 5, 1952 W. G. ABNEY 2,584,410
ADJUSTABLE TRACTOR WHEEL MOUNTING
Filed Aug. 19, 1949 2 SHEETS—SHEET 1
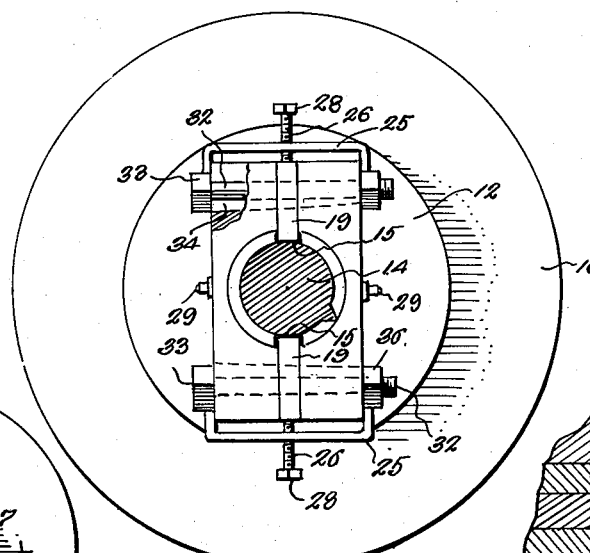
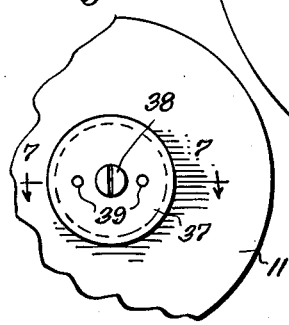
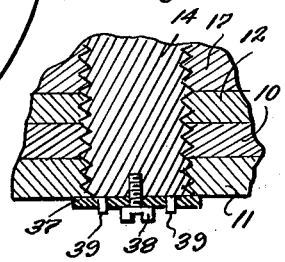
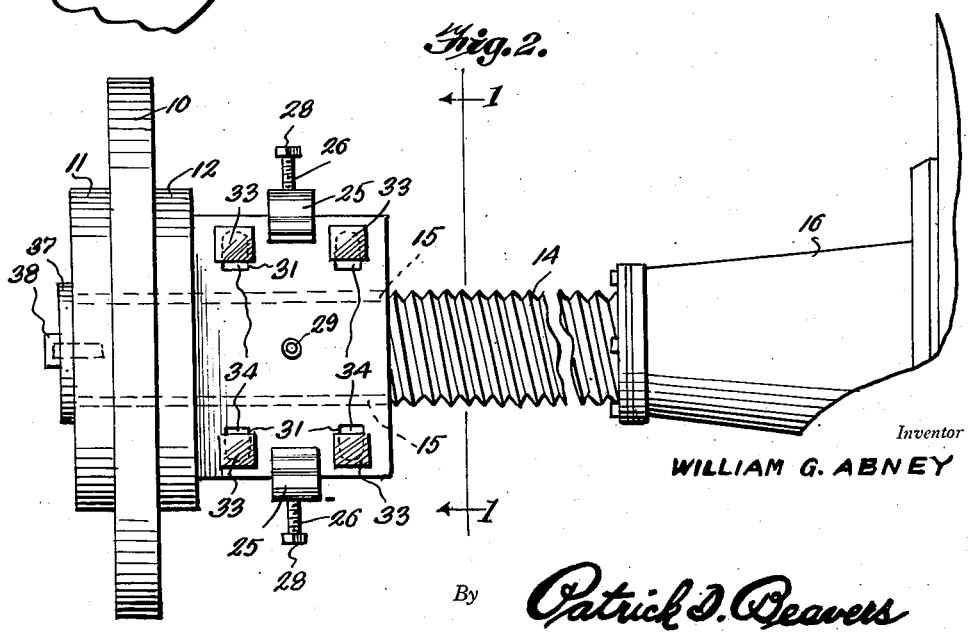
Inventor
WILLIAM G. ABNEY
By Patrick D. Beavers
Attorney

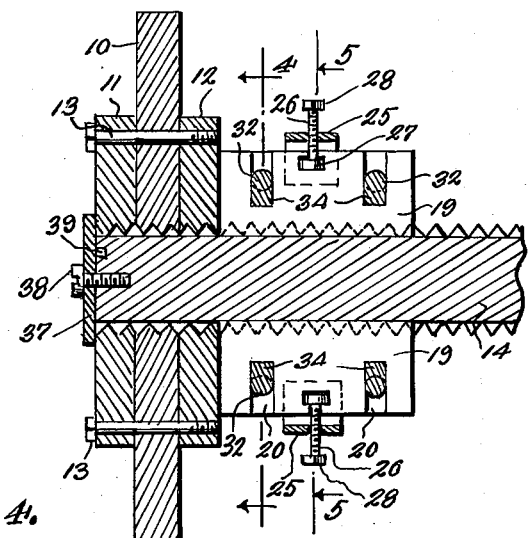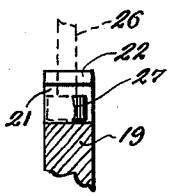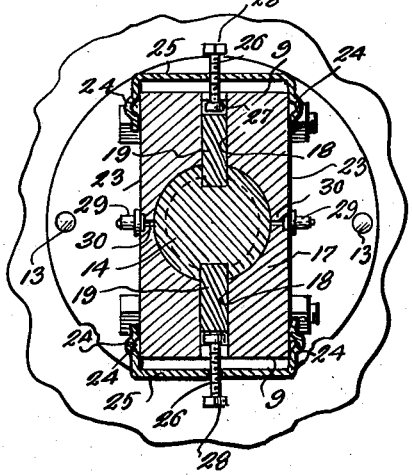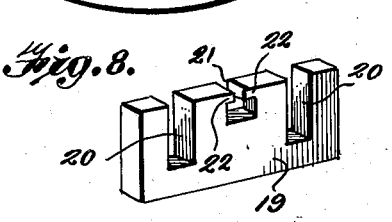

Patented Feb. 5, 1952

2,584,410

UNITED STATES PATENT OFFICE 2,584,410

ADJUSTABLE TRACTOR WHEEL MOUNTING

William G. Abney, Drexel, Mo., assignor of forty per cent to Stephen J. Hruska, Paola, Kans.

Application August 19, 1949, Serial No. 111,230

1 Claim. (Cl. 301—1)

The present invention relates to adjustable tractor wheel mountings and it consists in the combinations, constructions and arrangements of parts herein described and claimed.

Generally there is provided an especially constructed hub having novel means whereby the same may be locked in selected positions upon a tractor axle having a pair of diametrically opposed longitudinally extending keyways for receiving locking keys carried by the hub.

It is accordingly an object of the invention to provide an apparatus of the character set forth which is simple in construction, inexpensive to manufacture and effective and efficient in use.

Another object of the invention is the provision, in a device of the character set forth, of novel means for locking a hub in selected positions upon an axle.

A further object of the invention is the provision, in a device of the character set forth of novel key retaining means forming a part of the invention.

Another object of the invention is to provide a device of the character set forth which is capable of being used on either side of an axle.

A still further object of the invention is to provide a device of the character set forth which cannot be accidentally dislodged from an axle.

Still another object of the invention is the provision of a device for changing the position of a wheel upon an axle without the necessity for the use of jacks, blocks, bars, hammers, punches or the like.

A still further object of the invention is the provision of a device of the character set forth which will allow the resetting of tractor wheels in a minimum of time and effort.

Other and further objects of the invention will become apparent from a reading of the following specification taken in conjunction with the drawings, in which:

Figure 1 is a sectional view taken along line 1—1 of Figure 2,

Figure 2 is a side elevational view of an embodiment of the invention,

Figure 3 is a vertical sectional view of the device as shown in Figure 1,

Figure 4 is a sectional view taken along line 4—4 of Figure 3,

Figure 5 is a sectional view taken along line 5—5 of Figure 3,

Figure 6 is a fragmentary end elevational view of the device,

Figure 7 is a sectional view taken along line 7—7 of Figure 6,

Figures 8 and 9 are perspective views illustrating certain elements of the invention, and Figure 10 is an enlarged sectional view taken along line 10—10 of Figure 8.

Referring more particularly to the drawings, there is shown therein a hub comprising a center plate 10 having an outer plate 11 and an inner plate 12 secured thereto by bolts 13 or the like. The hub is threadably mounted upon an axle 14 which is provided with a pair of diametrically opposed longitudinally extending keyways 15 and the axle 14 extends outwardly from a conventional housing 16.

Formed integrally with the inner plate 12 is an inwardly extending block 17 having a substantially rectangular cross-sectional area. The block is likewise threadably connected with the axle 14 and the narrower sides 9 are provided with inwardly extending horizontally disposed slots 18 in each of which is slidably disposed a key plate 19 each of which is provided with an outwardly extending slot 20 adjacent each end thereof and a centrally disposed keyway 21 at its outer side. The keyway 21 is provided with inwardly extending shoulders 22.

The longer sides 23 of the block 17 are provided with horizontally extending ridges 24 adjacent each of the edges thereof and a clamp member 25 encompasses in spaced relation each of the sides 9, being removably engaged with the adjacent ridges 24.

Threaded centrally in each of the clamp members 25 is a bolt 26 which is provided with a rounded head 27 which lies in the keyway 21 and is confined therein by the shoulders 22. The outer end of each of the bolts 26 is provided with a fixed nut-head 28.

Centrally disposed in each of the sides 23 is a grease fitting 29 with a suitable passageway 30 leading to the axle 14.

Transversely extending through the block 17 adjacent each of the sides 9 is a pair of tapered openings 31 which are adapted to register with the slots 20 in the plates 19. The openings 31 are each provided with a bolt 32 which has a head 33 and a wedge 34 affixed to one side thereof and which extends from the head 33 a distance toward a threaded end 35. The wedge diminishes in size toward the threaded end 35. Nuts 36 are provided for the bolts 32.

A stop plate 37 is affixed by a cap screw 38 to the end of the axle 14 and is provided with inwardly extending pins 39 which engage suitable openings in the end of the axle 14.

In operation, it will be apparent that when it is desired to move a wheel to another selected position upon the axle 14, that it is only necessary to remove the nuts 36 and then remove the bolts 32 from the block 17, after which the nut-heads 28 are turned to thereby move the bolts 26 outwardly. This action will lift the key plates 19 out of the keyways 15 in the axle 14 due to the fact that the heads 27 bear against the shoulders 22 as the bolts 26 are turned in their threaded connections with the clamps 25.

The tractor engine may then be started and the proper gear enmeshed and the brakes applied lightly to the opposite wheel. This will cause the wheel under consideration to be moved to the position desired whereupon the engine will be stopped or its gears disengaged, after which the key plates 19 are manipulated into position adjacent the keyways 15 and the nut heads 28 turned to force the key plates into the keyways 15. The bolts 32 are then replaced in the openings 31 in such manner that the wedges 34 are upon the inner sides thereof. The wedges 34, bearing against the inclined faces of the openings 31 and against the inner ends of the slots 20 in the key plates 19 will act to lock the key plates firmly in the keyways 15 and thus hold the hub and wheel in the position selected.

The stop plate 37 will act to prevent the hub from accidental removal from the axle 14 and it will be apparent that the construction of the device is such that it may be used upon either end of an axle.

While but one form of the invention has been shown and described herein, it will be readily apparent to those skilled in the art that many minor modifications may be made without departing from the spirit of the invention or the scope of the appended claim.

What is claimed is:

A device of the character described comprising, in combination, an axle having threads and a pair of longitudinally extending diametrically opposed keyways, a wheel hub threadably mounted upon said axle, a block extending inwardly from said hub and likewise threadably connected with said axle and having a pair of diametrically opposed slots therein, key plates reciprocally mounted in said slots and engageable in the keyways of the axle, means for radially moving said key plates with respect to the axle, transversely extending bolts removably mounted in said block and wedges formed in the sides of said bolts and adapted to bear against the outer ends of the key plates, said means including key slots in the outer ends of said key plates, clamp members affixed to the block and bolts threadably mounted in said clamp members and each having an inner head revoluble in said key slots and an outer nut-head affixed thereto.

WILLIAM G. ABNEY.

REFERENCES CITED

The following references are of record in the file of this patent:

UNITED STATES PATENTS

| Number | Name | Date |
| --- | --- | --- |
| 597,329 | Rylander | Jan. 11, 1898 |
| 921,557 | Mussetter | May 11, 1909 |
| 2,151,045 | Ploehn | Mar. 21, 1939 |
| 2,182,240 | Sinclair | Dec. 5, 1939 |
| 2,235,457 | Lorimor | Mar. 18, 1941 |
| 2,324,681 | Dekker | July 20, 1943 |